United States Patent [19]

Kikukawa et al.

[11] Patent Number: 5,615,192
[45] Date of Patent: Mar. 25, 1997

[54] INFORMATION RECORDING AND REPRODUCING METHOD AND APPARATUS

[75] Inventors: Atsushi Kikukawa, Kokubunji; Sumio Hosaka, Tokyo; Youji Maruyama, Iruma; Toshimichi Shintani, Koganei; Takeshi Shimano, Hachioji, all of Japan

[73] Assignee: Hitachi, Ltd., Tokyo, Japan

[21] Appl. No.: 319,796

[22] Filed: Oct. 7, 1994

[30] Foreign Application Priority Data

Oct. 8, 1993 [JP] Japan ................. 5-252818
Dec. 20, 1993 [JP] Japan ................. 5-319400
Dec. 27, 1993 [JP] Japan ................. 5-330501

[51] Int. Cl.$^6$ ................................. G11B 7/00
[52] U.S. Cl. ................. 369/59; 369/58; 369/48; 369/62; 386/1
[58] Field of Search ................. 369/62, 126, 54, 369/58, 59, 60, 47, 48, 49, 50, 124; 358/328, 330, 340, 341; 360/19.1, 48; 250/306, 307

[56] References Cited

U.S. PATENT DOCUMENTS

| 5,199,021 | 3/1993 | Hatanaka et al. |
| 5,317,412 | 5/1994 | Morioka. |
| 5,375,114 | 12/1994 | Hatanaka et al. ............. 369/126 |
| 5,432,771 | 7/1995 | Shido et al. ................. 369/126 |
| 5,463,604 | 10/1995 | Naito ........................... 369/50 |

FOREIGN PATENT DOCUMENTS

| 0241934A2 | 10/1987 | European Pat. Off. . |
| 0275090 | 7/1988 | European Pat. Off. . |
| 0469879A2 | 2/1992 | European Pat. Off. . |
| 0603705A2 | 6/1994 | European Pat. Off. . |

OTHER PUBLICATIONS

"Phase–Locked Loops", Dr. Roland E. Best, pp. 216–229, 1984.
"Phaselock Techniques", Floyd M. Gardner, Ph.D., 1966.

*Primary Examiner*—Muhammad N. Edun
*Attorney, Agent, or Firm*—Antonelli, Terry, Stout & Kraus, LLP

[57] ABSTRACT

A recording-reproducing apparatus can remarkably relax the reproduction tracking accuracy by use of a head wider than the track width. The carrier signal frequency assigned to a recording track is designated to a synthesized signal generator. In compliance with this designation, the synthesized signal generator generates a signal of the designated frequency. This carrier signal is amplitude-modulated by the baseband signal to be recorded in a mixer. The unrequired frequency components are removed from this modulation signal by a bandpass filter, and the resulting signal is recorded in a recording medium by a head. The recording medium and the head are in relative motion. In read mode, a track is specified by the carrier signal.

24 Claims, 7 Drawing Sheets

INFORMATION RECORDING AND REPRODUCING METHOD AND APPARATUS

BACKGROUND OF THE INVENTION

The present invention relates to an information recording-reproducing apparatus for recording and reproducing digital and analog information including video and audio information for video and audio equipment and external memory units of electronic computers.

External memory units for information equipment including electronic computers are roughly divided into disk-type and tape-type apparatuses. For all the disk-type information recording-reproducing apparatuses and a part of the tape-type information recording-reproducing apparatuses, the surface of the recording media is split into tracks in which information is recorded.

The recording and reproducing operation for each track requires the movement of a head providing recording-reproducing means on the track. This operation is called the tracking. The tracking is generally performed on the basis of the signal reproduced from reproducing means. In order to improve the recording density, the track width and the space between tracks have been reduced. In parallel with this, efforts have been made to improve the absolute mechanical accuracy of apparatuses for securing an accurate tracking.

In magnetic disks, for recording binary-coded digital signals, codes are converted (modulated) in such a way that the signal obtained at the time of reproducing is capable of self synchronization. These methods, some of which are for recording the FM (frequency modulation) signals, are strictly aimed at recovering clock signals required for deciding on the code from the reproduction signal.

SUMMARY OF THE INVENTION

A typical information recording-reproducing apparatus which has the highest recording density at present is a magneto-optical disk. Current standard magneto-optical disks have a track width and space of 1.6 µm and a recording magnetic domain of about 1 µm in diameter. In these apparatuses using the classic optical system, the size of the magnetic domain capable of recording and reproducing is controlled exclusively by the diffraction limit of light used for recording and reproducing and therefore is expected to remain at about 1 µm. In contrast, a plurality of recording methods capable of remarkably increasing the recording density over the current information recording-reproducing apparatuses have recently been suggested. Specifically, there have been proposed a method for forming an uneven medium surface of synthetic resin with the tip of a minute probe heated with laser light and a recording method in which a vertically magnetized film is locally heated by the use of an optical fiber with a sharp tip thereby to cause a magnetization switch. The former is described in Applied Physics Letters, 1992, Vol.61, Sections 1003–1005, and the latter in Applied Physics Letters, 1992, Vol.61, pp.142–144. These methods are expected to realize the recording in the diameter of about 50 nm sooner or later. The recording on the order of nanometers is naturally accompanied by the track width and track space on the order of nanometers. In other words, the tracking requires also the accuracy of the order of nanometers. Assuming the rotational speed equivalent to that of the current magnetic disks and the relative speeds of head and medium, however, the tracking on the order of nanometers is very difficult to attain from the viewpoint of mechanical accuracy. The relative speeds of medium and reproducing means (head) is a very important factor for determining the input and output (recording and reproducing) rates in an information recording-reproducing apparatus, and therefore any compromise in this point is not desirable as the apparatus performance would otherwise be deteriorated. One of the problems encountered in realizing an information recording-reproducing apparatus capable of higher-density recording is the great difficulty of achieving the tracking accuracy on the order of nanometers.

Another problem caused when reducing the track space with the intention of achieving a high density is inter-track interferences. This is a phenomenon in which the information on the tracks other than the intended one mixes with the reproduction signal. Intertrack interferences occur when the tracking is incomplete and the head is influenced by adjacent tracks. Track interferences therefore occur more easily, the narrower the track space. Also, with a very narrow track space, adjacent tracks are influenced by each other, and even when the tracking is accurate, the intertrack interference occurs. One of the problems in realizing an information recording-reproducing apparatus capable of higher density recording therefore is the easy occurrence of intertrack interferences.

With the increase in density, the recording area per bit decreases. As a result, the intensity of the reproduction signal and the signal-to-noise ratio of the reproduction signal are deteriorated. Another problem in realizing an information recording-reproducing apparatus capable of higher density recording therefore is the reduction in reproduction signal intensity and the resulting deterioration of the SN ratio of the reproduction signal.

The above-mentioned problems are not limited to the information recording-reproducing apparatus based on the new methods described above but are shared also by the magnetic disk and the magneto-optic disk.

Further, an information recording-reproducing apparatus capable of high density recording is expected to be realized by a recording unit of near field optical microscopy type configured utilizing a compact and inexpensive optical fiber probe high in switching speed as a home-use device.

In order to solve the above-mentioned problems, according to one aspect of the invention, there is provided an information recording-reproducing method for recording and reproducing information physico-chemically on a recording medium, in which the recording surface of a recording medium is divided into a plurality of tracks, at least adjacent tracks on the recording surface are assigned different modulation parameters, a carrier signal specified by a modulation parameter designated for the recording track is modulated with an information signal to be recorded on the basis of the particular modulation parameter, the modulation signal is recorded in the particular track, the modulation parameter assigned to the track holding the information of interest is designated at the time of reading the information, and the original information is demodulated from the reproduction signal obtained from the recording signal reproducing means on the basis of the particular modulation parameter. The modulation parameter is a term collectively referring to the matters to be designated in modulating the carrier signal, including the modulation method, the modulation index and the carrier signal frequency. The variation of modulation parameters means a variation of a part or the whole of the modulation parameters.

According to another aspect of the invention, there is provided an information recording-reproducing apparatus for physico-chemically recording and reproducing information on a recording medium, comprising a recording medium with the recording surface divided into a plurality of tracks, means for assigning modulation parameters to the tracks in such a manner that at least adjacent tracks have different modulation parameters on the recording surface, means for modulating the carrier signal specified by the modulation parameter designated for a recording track, with an information signal to be recorded on the basis of the same modulation parameter, means for recording the modulation signal on the particular track, means for reproducing the modulation signal recorded on the recording medium, means for designating the modulation parameter of the track recorded with the desired information, and means for demodulating the desired information from the reproduced signal using the designated modulation parameter. More specifically, the demodulation means has the filter function of removing the demodulation signal representing any reproduction signal from the tracks recorded with a modulation parameter different from the designated one, whenever that reproduction signal is mixed in the reproduction signal input.

According to still another specific aspect of the invention, each track on the recording medium is assigned a unique modulation parameter.

According to a further specific aspect of the invention, there is provided an information recording-reproducing apparatus comprising means for assigning a unique modulation parameter to each track on the recording medium.

According to a yet another specific aspect of the invention, assignment of the same modulation parameter is allowed to different tracks spaced from each other by more than the sensitive range of the reproducing means along the track width.

According to a yet further specific aspect of the invention, there is provided an information recording-reproducing apparatus comprising means for assigning the same modulation parameter to different tracks spaced from each other by more than the sensitive range of the reproducing means along the track width.

According to another specific aspect of the invention, the tracks on the recording medium are divided into a plurality of groups of adjacent tracks and assigned a modulation parameter in such a manner that at least the tracks included in the same group have different modulation parameters from each other.

According to still another specific aspect of the invention, the combination of modulation parameters assigned to each group of tracks is the same for each of the different groups.

According to a further specific aspect of the invention, the combination of modulation parameters assigned to each group of tracks is unique for each of the different groups.

According to a yet another specific aspect of the invention, the modulation of the carrier signal is amplitude modulation.

According to a further specific aspect of the invention, the means for modulating the carrier signal includes an amplitude modulator.

According to a yet further specific aspect of the invention, the modulation of the carrier signal is angle modulation.

According to a still further specific aspect of the invention, the means for modulating the carrier signal includes an angle modulator.

The configuration of a recording apparatus of near field optical microscopy type using a semiconductor device as a light source for recording and reproducing operations realizes an apparatus small in size, low in cost and high in switching speed.

The above-mentioned method or apparatus configuration for recording and reproducing information physico-chemically on a recording medium makes it possible to acquire the information of interest accurately. In such a method or apparatus configuration, the recording surface of the recording medium is divided into a plurality of tracks, each assigned a modulation parameter in such a manner that at least adjacent tracks on the recording surface have different modulation parameters, the carrier signal specified by the modulation parameter designated for the recording track is modulated with the information signal to be recorded on the basis of the same modulation parameter, the modulation signal is recorded on the track, the modulation parameter assigned to the track holding the information of interest is designated from the reproduction signal obtained from the recording-reproducing means, and the original information is demodulated on the basis of the modulation parameter. The demodulation means, in particular, can be configured to include filter means for removing from the reproduction signal input the demodulation signal associated with a signal from tracks recorded with a modulation parameter different from the designated one. In such a configuration, even when the reproduction signal from the recording medium contains the reproduction signal components from an adjacent track, the information of interest alone is reproduced as a demodulation output, and therefore the tracking accuracy for reproducing operation is relaxed.

Assignment of unique modulation parameters to all the tracks on the recording medium renders each track identifiable.

The configuration or method for assigning the same modulation parameter to different tracks spaced from each other by more than the sensitive range of the reproducing means along the track width has the effect of relaxing the tracking accuracy for reproducing operation without using a modulation parameter departing from the optimum modulation parameter from the viewpoint of recording density, etc. Also, such a configuration or method prevents an unnecessary increase in the hardware size or cost of the modulation means and demodulation means.

On the other hand, the configuration or method in which the tracks are divided into a plurality of groups each including a plurality of tracks in such a manner that the combination of modulation parameters assigned to each group is the same for different groups has also the effect of preventing an unnecessary increase in the hardware size and cost of the modulation means and demodulation means.

Also, the configuration or method in which the tracks are divided into a plurality of groups each including a plurality of tracks in such a manner that the combination of modulation parameters assigned to each group is unique for each of different groups has the effect of permitting identification of each group.

Further, the use of an amplitude modulator as a means for modulating the carrier signal has the effect of making possible the recording of the amplitude-modulated signal.

Furthermore, the use of an angle modulator as a means for modulating the carrier signal has the effect of permitting the recording of the angle-modulated signal.

In addition, the semiconductor laser making up a light source for recording and reproducing is integrated with a photodiode so that the current flowing in the semiconductor laser is controlled for controlling the intensity of the laser light or for switching. The laser light output from this semiconductor laser is controlled for each recording track as described above.

DESCRIPTION OF THE PREFERRED EMBODIMENTS

Figure 1:
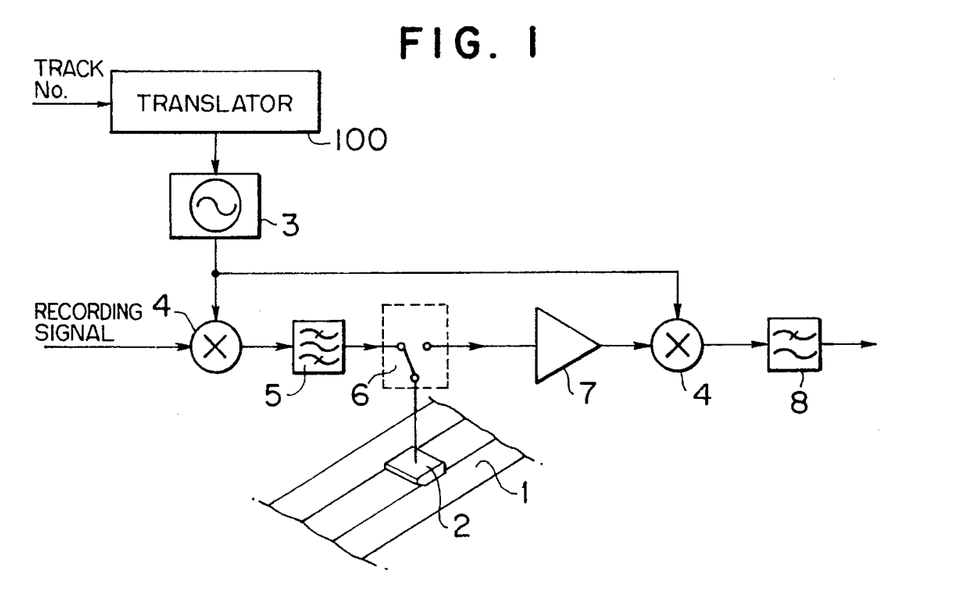
FIG. 1 shows an example configuration of an apparatus according to the invention using amplitude modulation for the recording signal.

Embodiment 1:

An embodiment of the invention is shown in FIG. 1. The recording scheme according to this embodiment is adaptable to various physico-chemical recording principles including the magnetic recording. In the description that follows, the recording principle will be explained without limitations.

Reference is made to the recording operation. First, the frequency of the carrier signal assigned to the recording track is designated to a synthesized signal generator 3. The synthesized signal generator 3 generates a signal of a frequency according to the designation. The carrier signal is amplitude-modulated by a baseband signal to be recorded in a mixer 4. Unnecessary frequency components are removed from the modulation signal by a bandpass filter 5, and the resulting modulation signal is recorded in a track 1 using a head 2. The medium and the head are of course in relative motion. In the process, a change-over switch 6 is turned to write side W. Although the modulation signal is recorded directly in the medium according to this embodiment, the modulation signal may alternatively be modulated or frequency-converted beforehand.

The carrier frequency is assigned to each track either by using a reference table defined in advance or by calculations based on the track number. The latter method is employed in FIG. 1. More specifically, upon application of a track number thereto, a translator 100 calculates the frequency index data in accordance with the algorithm defined in advance. The calculation operation, which is sufficient if the desired carrier frequency index data is obtained from the track number, can use the track number itself in the simplest case. The contents of the data applied to the synthesized signal generator suitably include the frequency-dividing ratio of a frequency divider in the phase-locked loop in the synthesized signal generator. The synthesized signal generator is described in detail in "Phase Locked Loops", by Roland Best, published by McGraw-Hill, 1984.

Now, the reproducing operation will be explained. First, the change-over switch is turned to R side. The synthesized signal generator designates the frequency of the carrier signal assigned to the track of interest. The method for frequency designation is the same as for recording. The reproduction signal generated in the head is amplified by an amplifier 7, and then demodulated by being mixed with the output signal of the synthesized signal generator in a mixer. The unrequired high-frequency components are removed by a low-pass filter 8.

The cut-off frequency of the low-pass filter is set to an equal frequency as the occupation bandwidth of the baseband signal. Therefore, the signal from a track other than the track of interest is frequency-converted outside of the band of the low-pass filter on output side by a frequency mixer at the time of reproducing. Thus the interferences from other tracks are removed. This greatly contributes to removing the influences of adjacent tracks other than the track of interest which occur at the time of reproducing from the recording medium with very narrow track spaces. Also, in view of the fact the signal from tracks other than the track of interest are allowed to enter the reproducing system, it is possible to use a reproducing head wider than the track width. In reproducing mode, it is sufficient if the track of interest covers only a part of the wider head, and therefore, the tracking accuracy for reproduction is relaxed by the head width. The method under consideration is thus very effective when applied to an ultra-high density information recording-reproducing apparatus requiring a tracking accuracy on the order of nanometers.

The signal recorded in the medium is an analog type signal. When the method under consideration is applied to magnetic recording, therefore, the non-saturated magnetic recording advantageous to high density can be realized. In the case of recording based on the magnetism or other principles according to this method, a local recording defect on the medium does not necessarily lead to the loss of recorded information. This method, therefore, is suitable especially for ultra-high density recording which is less subjected to tracking errors in recording mode, local physical or chemical defects or construction variations of the medium.

Also, according to this method, the baseband signal for recording may be either a digital (binary) signal, an analog signal or a mixture thereof.

As will be understood from the foregoing explanation, the sensitive range of the reproducing head can be widened with respect to the track width. If the minimum requirement of relaxing the tracking accuracy for reproduction is to be secured, different carrier signal frequencies are designated to adjacent ones of the tracks formed on the recording surface of the recording medium. Generally, more carrier signal frequencies had better been assigned sequentially to tracks arranged on the recording surface. In other words, the same signal frequency is allowed to be assigned to different tracks spaced by more than the sensitive range of the reproducing head, and a plurality of carrier signal frequencies are sequentially assigned to the tracks. Unique carrier signal frequencies may of course be assigned to each track.

Figure 2:
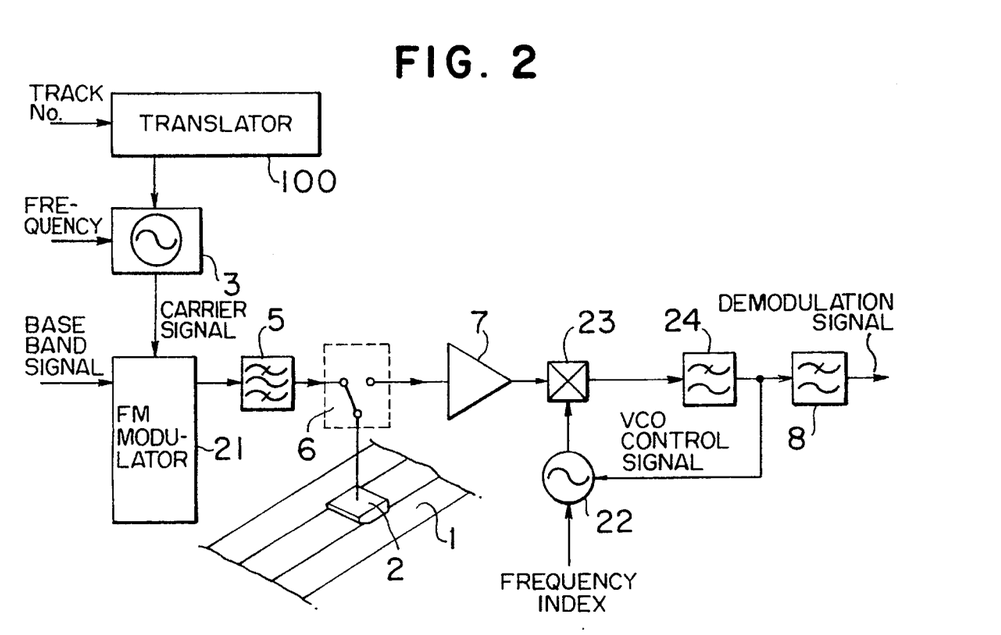
FIG. 2 shows an example configuration of an apparatus according to the invention using frequency modulation for the recording signal.

Embodiment 2:

FIG. 2 shows an example using the frequency modulation (FM) as a modulation scheme. The recording method shown in this embodiment is applicable to various physico-chemical recording principles including magnetic recording. The explanation that follows is not specifically limited in the recording principle.

At the time of recording, the carrier signal frequency assigned to the track to be recorded is designated to a synthesized signal generator using the same method as described with reference to the first embodiment. The synthesized signal generator generates the carrier signal of designated frequency. This carrier signal is frequency modulated by an FM modulator 21 with the baseband signal to be recorded. The unrequired frequency components are removed from this modulation signal by a bandpass filter 5, and the resulting signal is recorded in the appropriate track by the use of the head 2. The medium and the head are of course in relative motion. In the process, the change-over switch 6 is held to W side. Instead of recording the modulation signal directly on the medium as according to the present embodiment, the signal may be further modulated and frequency-converted before recording.

Now, the reproducing operation will be explained. First, the change-over switch 6 is turned to R side. The reproduction signal generated in the head 2 is amplified by an amplifier 7, and demodulated by an FM discriminator. Various types of FM discriminator are available. According to the embodiment under consideration, a PLL (phase locked loop) is used. PLL is a widely-known technique and described in detail, for example, in "Phaselock Techniques" by Floyd Gardner, published from John Wiley & Sons, 1966. The PLL operation will be briefly described below. The reproduction signal amplified is compared with the oscillation signal of a voltage-controlled oscillator 22 by a phase detector 23. The high-frequency components are removed from the output signal of the phase detector 23 by a loop filter 24. The output of the loop filter 24 is used as a control voltage for the voltage-controlled oscillator (VCO). The oscillation frequency of the voltage-controlled oscillator 22 fluctuates with the control voltage. The phase detector, the loop filter and the voltage-controlled oscillator make up a single closed loop. This closed loop works in such a way that the VCO control voltage is automatically regulated to equalize the VCO output frequency to the input signal frequency in the case where the input (reproduction) signal frequency is sufficiently in the vicinity of the oscillatable frequency of VCO. In other words, the VCO control voltage follows the input frequency change and therefore operates as an FM discriminator. The unrequired high-frequency components are removed by a low-pass filter 8.

With PLL, the state in which the VCO oscillation frequency is automatically controlled equal to the input signal frequency is called the phase-locked state. The frequency range of the input signal in which PLL can be phase-locked is determined by the characteristics of the loop filter and the VCO. The width and the center frequency of the frequency range in which PLL is phase-locked is variable by changing the circuit constants of the VCO.

Figure 3:
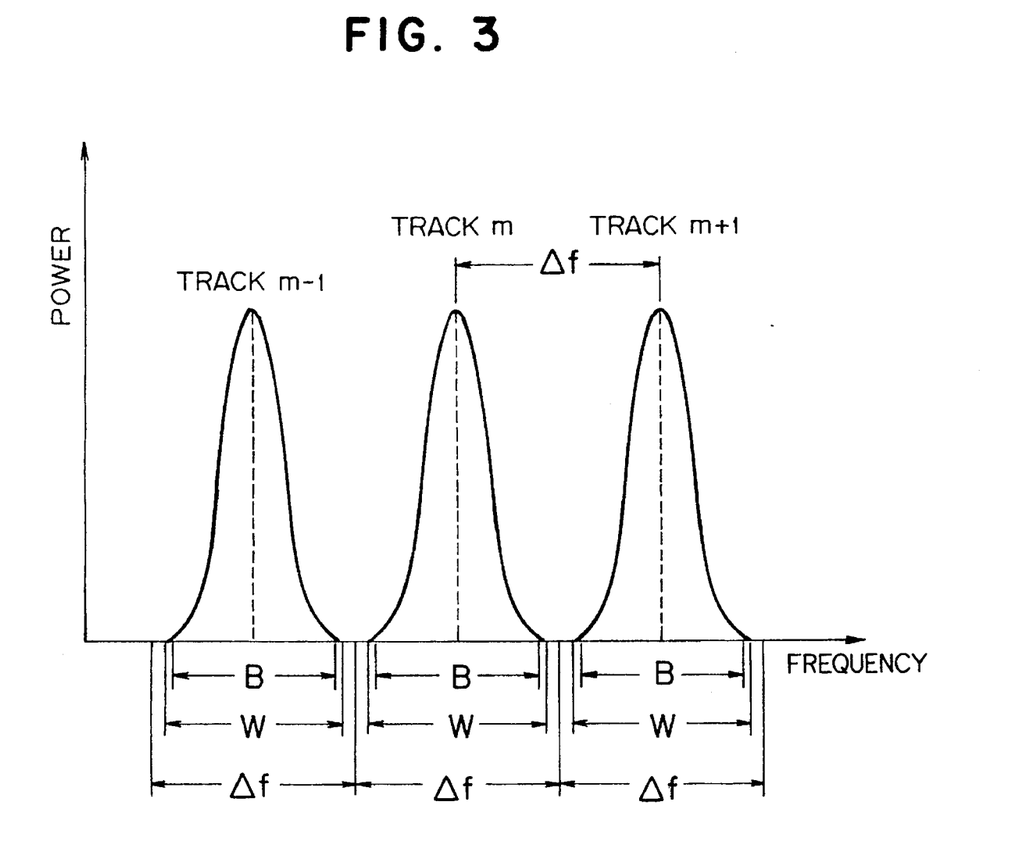
FIG. 3 is a diagram for explaining the relationship between the carrier frequency intervals, the lock range of the phase-locked loop and the occupation bandwidth of the modulation signal.

In the case where information from a given track is reproduced, the VCO is instructed to phase-lock the PLL for the carrier frequency assigned to the particular track. According to the embodiment under consideration, as shown in FIG. 3, the frequency range W wherein the PLL is capable of being phase-locked is centered at the designated frequency and slightly wider than the occupation bandwidth B of the modulation signal recorded in each track. Also, the carrier frequency intervals Δf between adjacent tracks are slightly wider than the width of the frequency range wherein the PLL is phase-locked. As a result, as long as the track of interest is within the sensitive range of the head, the PLL is positively phase-locked only for the reproduction signal of the intended track. The information of interest is thus reproduced as a change in VCO control voltage.

Figure 5:
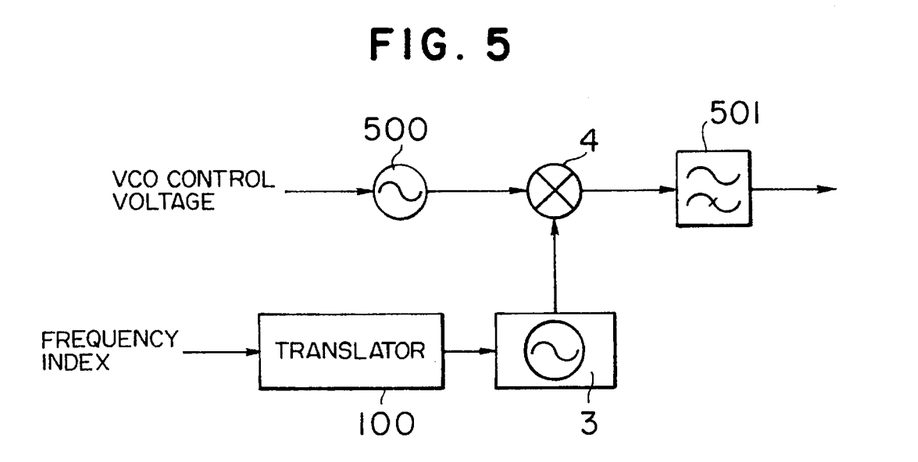
FIG. 5 shows an example configuration of a VCO (voltage-controlled oscillator) used according to an embodiment of the invention.

The VCO used according to this embodiment is shown in detail in FIG. 5. The feature of this VCO lies in that not only the frequency is variable by a control voltage but also the center frequency of the oscillator can be changed over a wide range with intervals of Δf by separate frequency instructions. In this way, the PLL can be phase-locked only to the carrier of interest and cover a wide range of frequencies. Now, the operation will be explained. A voltage-controlled oscillator 500 is a normal type in which the oscillation frequency can be changed by the VCO control voltage. The center frequency of this oscillator is set sufficiently low as compared with the desired carrier frequency. Upon receipt of a frequency designation, a translator 100 instructs the synthesized signal generator to generate a signal having a frequency equivalent to the difference between the desired carrier frequency and the central frequency of the voltage-controlled oscillator of normal type. The output of the synthesized signal generator 3 and that of the voltage-controlled oscillator 500 of normal type are applied to a mixer 4. This mixer 4 generates a signal having a frequency equivalent to the sum and the difference between the two signals. The required one of the two signals is the signal having a sum frequency. The output of the mixer 4 therefore is applied through a high-pass filter 50 to remove the signal having the difference frequency.

In the example shown in FIG. 2, the PLL phase-locks only the reproduction signal from the track of interest. The intended information therefore can be reproduced without being affected by a signal which may intrude from other tracks. In other words, inter-track interferences can be prevented. Also, signals from tracks other than the intended track are allowed in the reproducing system, and therefore a reproducing head can be used which is wider than the track width. In reproduction mode, it is sufficient if the intended track covers any part of the wide head. The tracking accuracy for reproduction, therefore, is relaxed by the amount of head width. The system according to the invention is thus applicable very effectively to an ultra-high density information recording-reproducing apparatus requiring the tracking accuracy of the order of nm. According to the embodiment under consideration, the aforementioned effect is attained at least by changing the carrier signal frequencies alternately between adjacent tracks. In more general applications, however, the same carrier signal frequency is allowed to be assigned to different tracks spaced from each other by at least the sensitive range of the reproducing head. In this way, a plurality of carrier signal frequencies are assigned sequentially to tracks in alignment.

The signal recorded in the medium is an analog type signal. When the system according to the invention is applied to magnetic recording, therefore, a non-saturated recording advantageous to high density recording can be employed. In this method, when used for recording based on magnetism or other principles, the local recording loss on the medium does not immediately lead to the loss of information recorded. This method, therefore, is not easily affected by the tracking error or local physico-chemical defects or variations in composition or structure of the medium at the time of recording, and is suitable for ultrahigh density recording.

Also, the recording system according to the present invention is especially effective when used for the recently-suggested recording principles which are capable of exceeding by a wide margin the recording density of the conventional information recording-reproducing apparatuses. Specific examples of these recording principles include a method for forming an uneven medium surface of synthetic resin with the tip of a minuscule probe heated by laser light, and a method for recording by causing a magnetization switching with a vertically magnetized film heated locally using an optical fiber having a sharp tip. These methods are expected to make the recording in the diameter of about 50 nm possible sooner or later. In the case where the conventional recording methods by which data are merely recorded are used, however, a much higher tracking accuracy is required than that for the currently-available magnetic disks. According to the method under consideration, on the other hand, a plurality of carrier signal frequencies are used, and therefore only the carrier signal frequency with optimum linear recording density is not used at the sacrifice of some linear recording density. Nevertheless, a linear recording density equal to or higher than that of the magnetic disk or the magneto-optical disk can be easily achieved. Also, the remarkable improvement in tracking accuracy makes it possible to realize an ultrahigh density information recording apparatus using a mechanism having a tracking accuracy equivalent to the magnetic disk.

In the method for forming an uneven medium surface of synthetic resin with the tip of a minuscule probe heated by laser light or the recording method with magnetization switching caused by heating a vertically magnetized film locally using an optical fiber having a sharp tip, the frequency-modulated (FM) signal can be recorded by changing the length of the recording mark along the direction in which the medium is driven. In this case, the waveform of the reproducing signal, which may be different from that of the recording signal, does not matter. What is important is the frequency. Therefore, no special problem occurs at the time of reproducing.

According to the present method, the baseband signal to be recorded may be either a digital (binary), an analog signal, or a mixture of the two. When a digital signal is recorded, the code recorded may not be binary but may be based on other number system. Further, a phase-modulated signal may be used for recording and reproducing instead of modulating the frequency of the carrier signal. Furthermore, the frequency or phase modulation of the carrier signal may be combined with amplitude modulation. As a result, input/ output of a multi-value signal is made possible, and a higher data transfer rate is realized in the same frequency bandwidth.

The present embodiment has the following advantages as compared with the first embodiment. In the first embodiment, at the time of reproducing, the reproduction signal must be mixed with a signal of the same frequency as the carrier signal used at the time of recording. Otherwise, the amplitude of the reproduction signal changes with time and thus has an adverse effect. The frequency of the reproduction signal changes with the relative speed between head and medium. Therefore, the relative speed between head and medium is required to coincide at the time of recording and reproducing. In this way, the apparatus of the first embodiment demands a higher accuracy of a part of the component elements. In contrast, by far the relaxed absolute accuracy is required of the apparatus of the second embodiment. More specifically, even when the frequency of the reproduction signal changes with the variations in relative speed between head and medium, it is sufficient if the PLL can be phase-locked against the reproduction signal. With the amplitude modulation, the use of a synchronous amplitude detector for extracting the carrier signal from the reproduction signal by the PLL permits the demand to be relaxed with regard to the variations in relative speed between head and medium.

In magnetic disks or the like, the code is converted (modulated) when recording a binary-coded digital signal in such a manner that the signal obtained at the time of reproducing can be self-synchronized. Some of these methods are to record an FM signal or an FSK (frequency shift keying) signal including a binary coded clock signal to be recorded and a double-frequency signal, but are in any way intended to extract the timing signal required for code discrimination from the reproducing signal. According to the present invention which is different from these methods, when binary coded information is recorded, a carrier signal having a given frequency higher than the clock frequency of the information is modulated by a binary code based on an appropriate modulation index.

Figure 4:
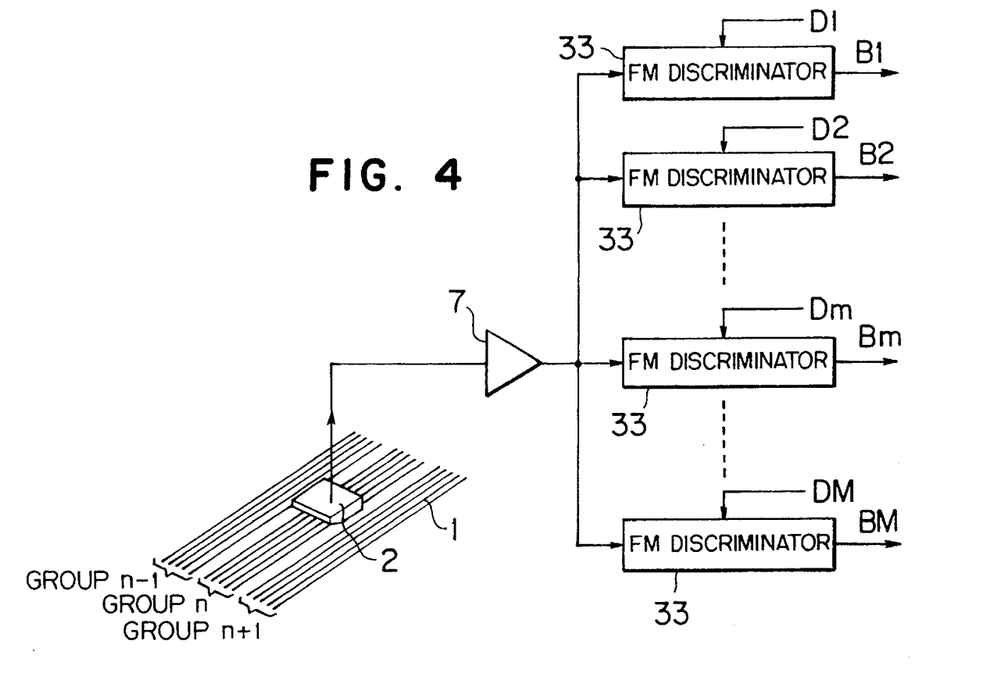
FIG. 4 shows an example configuration of an apparatus according to the invention capable of reproducing a plurality of tracks at the same time.

Embodiment 3:

FIG. 4 shows a reproducing method which is capable of reproducing a plurality of adjacent tracks at the same time according to an embodiment. This reproducing method is applicable to various physico-chemical recording-reproducing principles. Explanation will be made below without specially limiting the recording principle. Although the description is confined to reproducing operation, means for writing information in a medium include the provision of a head for recording or the transfer from a stamper like a compact disk (CD). The signal recorded in the medium is of course modulated based on the appropriate technique. According to this embodiment, explanation will be made about a frequency modulation, as an example.

In the reproducing method under consideration, a plurality of groups each including M adjacent tracks are newly defined. The reproducing head has a width sufficient to reproduce all the tracks in each group at a time. The head keeps tracking of a track group instead of a track. Each track in a group is assigned a carrier signal of a different frequency. In other words, a set of carrier signals of M different frequencies is assigned to each group. The sets of carrier frequencies assigned to the respective groups may be either the same or different. In the case where a unique set of carrier frequencies is assigned to each group, it is possible to decide whether the head accesses the intended group by analyzing the reproduction signal.

In FIG. 4, reference numeral 33 designates an FM discriminator, B1 the baseband signal of track 1, B2 the baseband signal of track 2, BM the baseband signal of track M, D1 the carrier frequency index signal for track 1, D2 the carrier frequency index signal for track 2, and DM the carrier frequency index signal for track M.

The reproduction signal obtained from the head 2 is amplified by an amplifier 7 and then demodulated by the FM discriminator 33 thereby to produce the original information. A PLL similar to that in the second embodiment is used in the FM discriminator. PLLs in the same number as the tracks (in the number of M) are provided, one for each track. According to this embodiment, as in the second embodiment and as shown in FIG. 3, the frequency range W in which each PLL can be in phase-locked state is centered on the designated frequency and covers a somewhat wider area than the occupation bandwidth B of the modulation signal recorded in each track. Also, the carrier frequency interval Df between adjacent tracks is somewhat wider than the frequency range phase-locked by the PLL. Each PLL is assigned a track for reproducing in one-to-one relation. More specifically, each VCO is instructed (with a carrier frequency index signal) to phase-lock the associated PLL to the carrier frequency of the signal recorded in each assigned track. Each PLL thus is positively phase-locked only against the reproduction signal of the intended track. As a result, the intended information is reproduced as a change in the VCO controlled voltage of the PLL associated with each track.

In the example shown in FIG. 4, the PLL is phased-locked only in response to the reproduction signal from the intended track, and therefore, the intended information can be reproduced without being affected by any signal which may intrude from other tracks. In other words, intertrack interferences can be prevented. Also, the use of a reproducing head wider than the track width relaxes the tracking accuracy for reproduction. In this way, this method is applicable very effectively to an ultrahigh density information recording-reproducing apparatus requiring the tracking accuracy on the order or nanometers.

The signal recorded in the medium is an analog signal, and therefore the non-saturated recording can be effected very advantageously to high density recording by the present method when applied to the magnetic recording. According to this method, in the recording operation based on magnetism or other principles, local recording defects on the medium do not necessarily lead immediately to the loss of information recorded. The method thus is not easily susceptible to the tracking error, the local physico-chemical defects or the change in the composition or structure of the medium at the time of recording, and therefore is suitable for ultra-high density recording.

Also, according to the present recording method, the tip of a minuscule probe is heated with laser light to form an uneven medium surface of synthetic resin. This method is especially effectively applicable to an apparatus using the recording principle of causing a magnetization switching by locally heating the vertically magnetized film using an optical fiber with a sharp tip. These techniques are expected to realize the recording in the diameter of about 50 nm before long. In the case where the conventional recording method is employed, however, a tracking accuracy much higher than that for the currently-available magnetic disks is required. The use of the recording method according to this embodiment, though at some sacrifice of linear recording density, can easily achieve a linear recording density at least equivalent to the magnetic disk or the magneto-optical disk. Also, the remarkably improved track density of the embodiment realizes an ultra-high density information recording apparatus using a mechanical means of a tracking accuracy equivalent to the magnetic disk.

In order to record the FM signal, the method for forming an uneven medium surface of synthetic resin by heating the tip of a minuscule probe by laser light or the recording method in which magnetization switching is caused by locally heating the vertically magnetized film using an optical fiber with a sharp tip, can be executed while changing the length of the recording mark along the direction in which the medium is driven. In this case, the waveform of the reproduction signal may be different from that of the recording signal. The waveform of the reproduction signal, however, does not matter and poses no special problem as what is important is the frequency.

According to this method, the baseband signal to be recorded is in either digital (binary) or analog form. Further, a mixture of digital and analog signals may also be used for recording. In the case where a digital signal is recorded, the code to be recorded may not be binary but may be based other number system. Furthermore, a phase-modulated signal can be used for recording and reproducing instead of the frequency modulation of the carrier signal. In addition, the frequency or phase modulation of the carrier signal may be combined with the amplitude modulation. As a result, input/output of a multivalued signal is made possible, so that a higher data transfer rate can be realized even in the same frequency bandwidth.

This embodiment, as compared with the first embodiment, has the following additional advantages. In the first embodiment, at the time of reproducing, the reproduction signal has to be mixed with the signal of the same frequency as the carrier signal used for recording. Otherwise, such adverse effects occur as an amplitude change of the reproduction signal with time. The frequency of the reproduction signal changes with the relative speed between head and medium, and therefore the relative speed between head and medium must coincide between recording and reproducing. In this way, the apparatus according to the first embodiment demands a higher accuracy for a part of the component parts. The absolute accuracy required of each component element of the apparatus according to the third embodiment, in contrast, is far more relaxed. More specifically, even when the frequency of the reproduction signal fluctuates in accordance with the change in relative speed between head and medium, it is sufficient if the PLL is capable of being phase-locked against the reproduction signal. Even with the amplitude modulation, to the extent that a synchronous amplitude detector is used for extracting the carrier signal from the reproduction signal using the PLL, the requirement for fluctuations in head-medium relative speed is relaxed.

Further, according to the third embodiment, a plurality of tracks can be reproduced at a time, and thus a high-speed reproducing operation is possible as compared with the first and second embodiments. Also, since whether the PLL is in phase-locked state or not is easily determined, it is decided whether the head is placed on the intended group according to whether all the PLLs are in phase-locked state or not.

Figure 6:
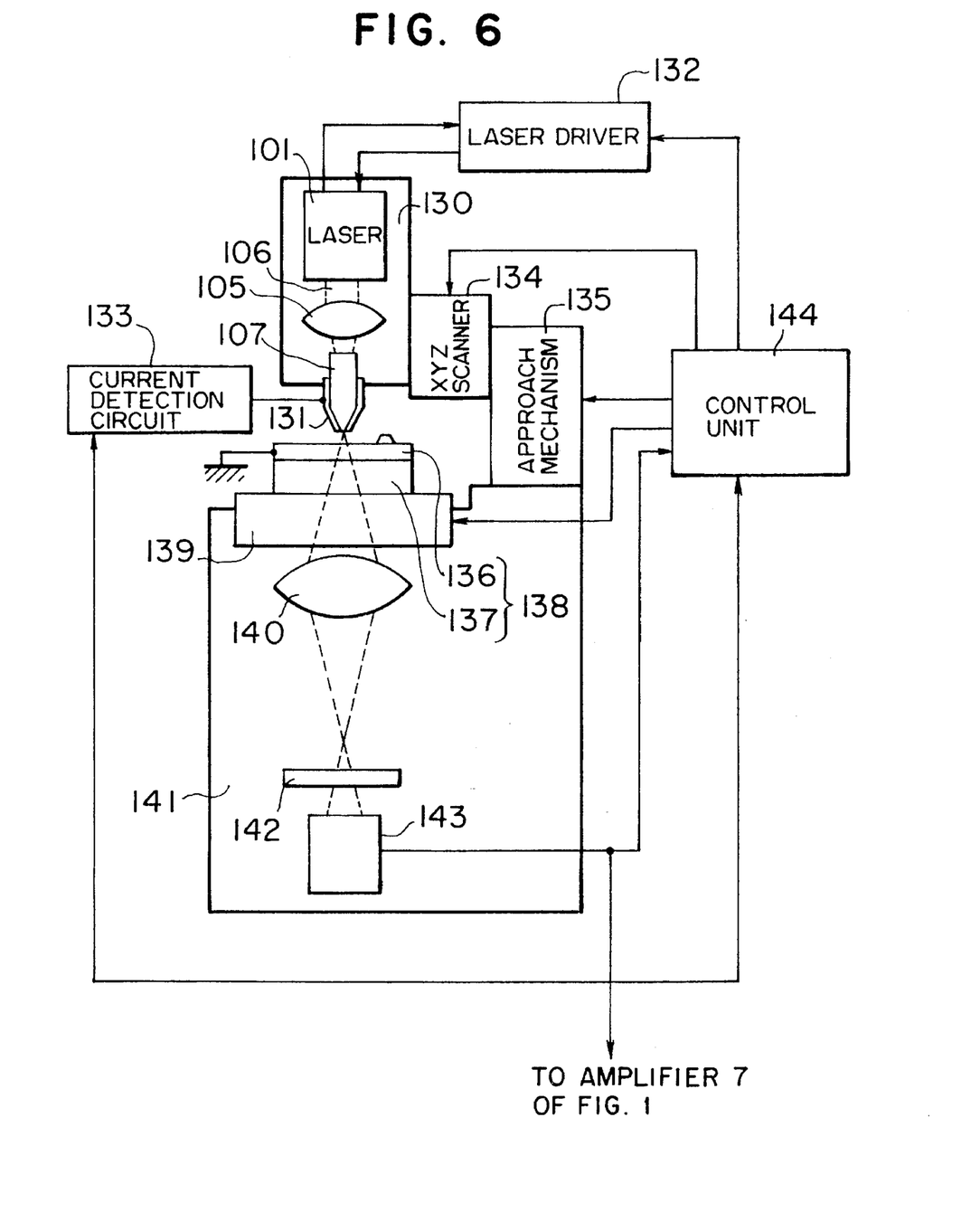
FIG. 6 is a block diagram showing an embodiment of the invention realized as a configuration of a recording-reproducing apparatus of near-field microscopy type using the optical fiber probe.

Now, a recording-reproducing apparatus of near field microscopy type using the optical fiber probe is shown in FIG. 6 as a configuration realized according to an embodiment of the invention.

In FIG. 6, an optical fiber probe is configured of a semiconductor laser 101, a lens 105 and an optical fiber 107 covered with a metal coating 131 arranged on a support plate 130 as shown. The optical fiber 107 preferably is a single-mode fiber. The lens 105 preferably is a focusing lens including a combination of cylindrical lenses as the semiconductor laser 101 has different beam divergence angles between X and Y directions. The tip of the fiber 107 has the metal coating 131 peeled off to expose the fiber portion of 100 nm or less in diameter. A fine inching mechanism for axis alignment for the semiconductor laser 101, the lens 105 and the fiber 107, though not shown in FIG. 6, is of course used and operated in an efficient coupling with the fiber 107.

A probe scanner includes an XYZ scanner 134 and an approach mechanism 135. The approach mechanism 135 is installed on the base 141 of a recording medium holder and has the functions of supporting the XYZ scanner 134 and bringing the optical fiber probe 107 mounted on the moving portion of the scanner 134 toward or away from the recording medium. Generally, an inch worm mechanism or a combination of motor and a reduction mechanism is used. The XYZ scanner 134 has the function of inching the optical fiber probe 107 along the XYZ axes, and mainly includes a piezoelectric device. This inching function is used for scanning the surface of the recording medium 138 by the probe 107 in the XY directions, and for maintaining a predetermined distance between the probe 107 and the recording medium 138 in the Z direction. The inching mechanism employs a structure of tripod type scanner, the cylinder type scanner or the like used with the scanning probe microscope.

The mechanism is described in U.S. patent applications Ser. No. 08/001,250 filed on Jan. 6, 1993 and Ser. No. 08/145,600 filed Nov. 4, 1993. These applications are incorporated herein by reference.

The recording medium holder holds an XYZ carriage 139 on the base 141, on which the recording medium 138 is mounted. The XYZ carriage 139 for mounting the recording medium 138 is constructed to secure a light path in such a manner that the evanescent light incident on the recording medium 138 is able to enter a polarized light detector through the substrate 37 of the recording medium 138 when the fiber 107 approaches to the recording medium. For this purpose, an aperture is formed in the recording medium carriage 139 through which light is allowed to pass. Instead of the XYZ carriage 139 supporting the recording medium, a mechanism can of course be used for holding the recording medium 138 with a rotational mechanism of the magneto-optical read/write system in general use, together with a mechanism for linearly moving the fiber probe 107, to realize a high-density recording in the same manner as the currently-available magnetic disk or the magneto-optical disk.

The polarized light detector, which is for detecting whether the evanescent light that has entered the recording medium 138 is polarized or not, includes a focusing lens 140, a polarizer 142 and a photomultiplier 143. Preferably, an XYZ carriage mechanism is often required and mounted for light beam alignment. These mechanisms are mounted on the base 141.

The detector of the interval between the probe 107 and the recording medium 138 employs the method of detecting the change in the interval and the physical amount. In the embodiment under consideration, a method using the tunnel phenomenon is employed. The interval is detected utilizing the tunnel current which begins to flow with the approach of the fiber 107 to the recording medium 138. The current detection circuit 133 applies a tunnel bias to the metal coating 131 and detects the value of the current that flows. The fiber 107 is controlled in Z direction in such a manner that the detected current is constant, thereby maintaining a constant interval between the probe 107 and the recording medium 138. The interval may be controlled alternatively by the method using the shear force or the capacitance.

The absolute value of the tunnel bias of the current detection circuit 133 is set to 1 V or less, and the approach mechanism is driven to make the optical fiber probe 107 approach to the recording medium 138. When the probe 107 approaches to the recording medium 138 within about 10 Å, the tunnel current flows indicating that the interval between the probe and the recording medium is 10 Å or less. In such a case, the Z-axis piezoelectric element of the XYZ scanner 134 is driven thereby to control the interval to maintain a constant tunnel current. In this way, the interval between the probe and the recording medium is kept at about 10 Å, thereby making possible an accurate observation of the recorded magnetic domain. The constant light 106 that has left the semiconductor laser 101 driven by the laser driver 132 enters the fiber 107, and the evanescent light leaking from the tip of the probe 107 is used for observation as a minute light probe. Under this condition, the scanner 134 is raster-scanned in the XY directions. In the process, if a perpendicularly recorded magnetic domain exists in the magnetic recording film 136 on the magnetic medium 138, the laser light that has passed through the magnetic domain has the polarization thereof slightly rotated, so that the light that has passed through the polarizer can be detected strong or weak by the photomultiplier as compared with the outside portion of the magnetic domain. This is detected with the probe scanning thereby to play back the recorded data.

The whole of these operations is performed by a control unit (generally, a microcomputer) 144. In read or reproduction mode, upon application of a read instruction to the control unit 144, the functions of approaching between the probe 107 and the recording medium 139 and the positional control of the probe 107 are initiated thereby to display the reproducing function. The control operation of the laser drive circuit 32 in response to the reproducing instruction and the recording instruction described later will be explained later.

Now, the recording operation will be explained. The recording operation requires the write-erase-read operation. The read operation is the reproducing operation described above. The write and erase are the same (overwrite) operation, and therefore only the write operation will be described below.

Figure 7:
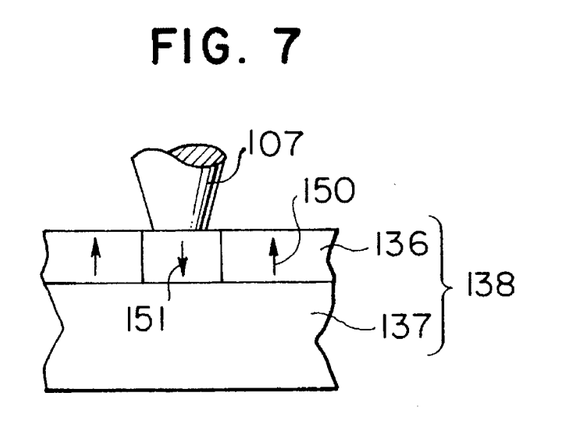
FIG. 7 is a diagram for explaining the recording operation according to an embodiment of the invention as applied to magnetic recording.

In FIG. 6, when the substrate is heated to the Curie temperature or higher of the magnetic recording film 136 of the recording medium 138, the demagnetization existing in the magnetic recording film 136 causes a magnetization 151 in the direction opposite to the outer magnetization direction 150 as shown in FIG. 7. In order to execute this magnetization, the laser power is increased as compared with the reproduction to increase the temperature of the magnetic recording film 136.

Figure 8:
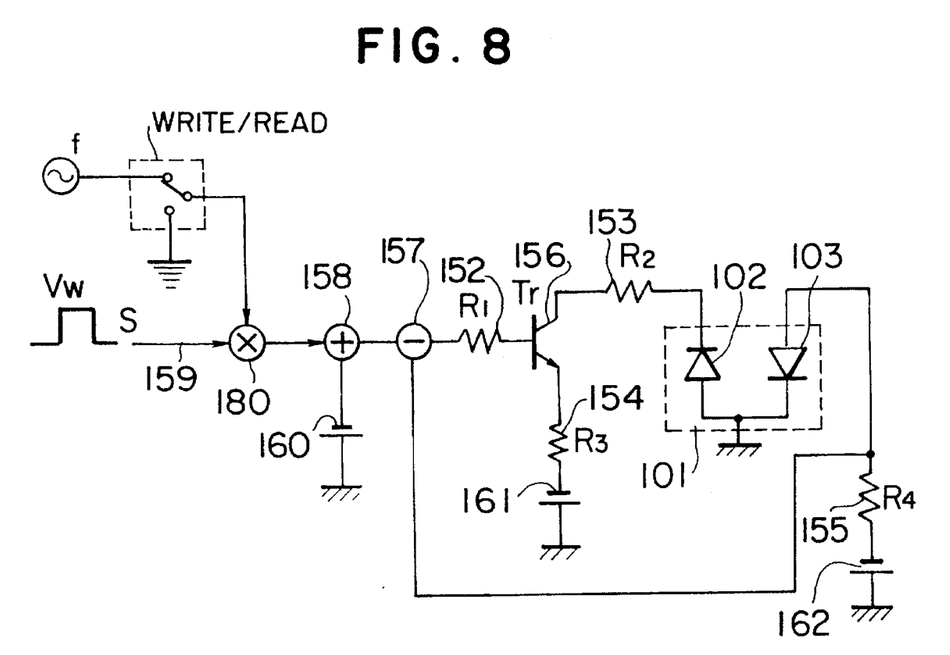
FIG. 8 is a circuit diagram showing an example of a drive circuit according to an embodiment of the invention.
Figure 9:
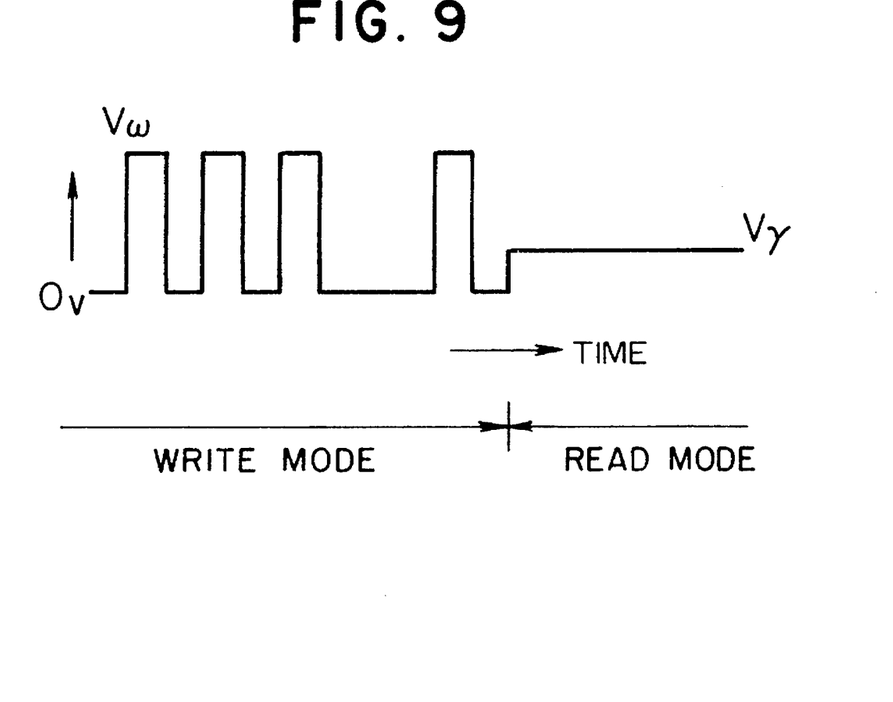
FIG. 9 shows an example waveform of an external signal (reference signal) for controlling the write/read operations according to an embodiment of the invention.

A basic circuit for driving the semiconductor laser 101 is shown in FIG. 8. An element 101 is configured of a laser diode 102 and a photodiode 103. In order to maintain a constant output of the photodiode 103, the current flowing in the laser element 102 is controlled in accordance with an external signal 159. Upon application of the external signal 159 as shown in FIG. 9, a bias voltage 160 is impressed on the signal 159 thereby to make up a reference signal. The output of the laser light 106 detects the detection signal from the photodiode 103 as an induced voltage of the resistor $R_4$ (155). In this case, the bias voltage 162 is detected in added state. This signal is applied to a comparator or subtractor circuit 157 for taking a deviation. The current value to the laser element 102 is controlled by a transistor 156 on the basis of the deviation signal. As a result, with the increase in the pulse voltage of the external signal 159, the large-output laser light 106 is led to the fiber 107 for write operation. The frequency of the pulse train is basically determined by the resistance and capacitance of the laser element 102. Repetitive pulses thus can be generated up to about 1 GHz.

In order to prevent the medium from being heated as far as possible in read mode as shown in FIG. 9, on the other hand, it is necessary to reduce the output of the laser light 106 to minimum. For this purpose, the pulse voltage of the external signal 159 is set lower than in write mode.

According to this invention, the external signal 159 to be recorded is modulated in accordance with the track to be recorded. The modulation frequency f is processed in such a manner that the multiplication is effected by a multiplier 180 when the write signal is involved as a signal corresponding to the write/read signal applied to the control unit 144. This is the same process as in the mixer 4 shown in FIG. 1. At the time of read operation, the external signal 159 to be recorded is obtained as a predetermined value Vr, and an end of the multiplier 180 is connected to the ground.

Figure 10:
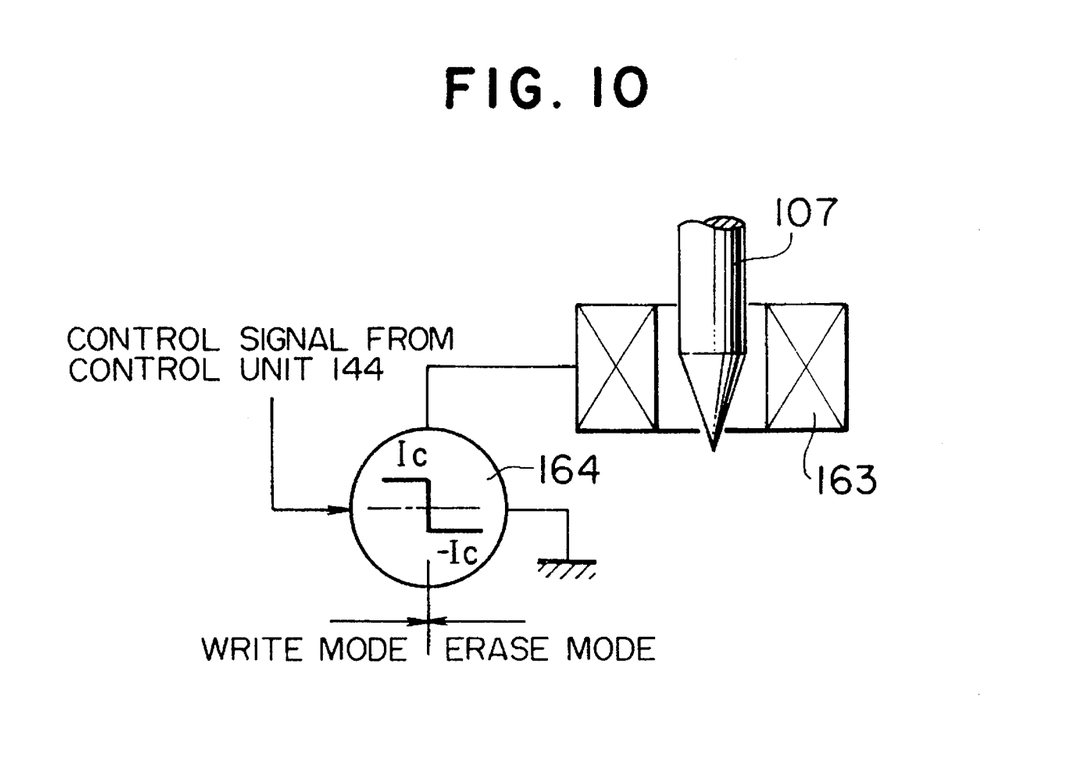
FIG. 10 is a diagram schematically showing an example of the recording-reproducing head for writing and erasing by an external magnetic field.

As described above, the semiconductor laser 1 could perform the write and read operations. If the erase or the write operation is to be performed accurately, however, a bias-magnetic field is required to be formed. In the case under consideration, means for applying an external magnetic field in the direction desired for magnetization (a coil 163 and a coil drive circuit 164) should be provided as shown in FIG. 10. The direction of the external magnetic field is changed in accordance with the write or erase operation to perform the write and erase operation. In the case where the photodiode 103 is not used, a constant-current circuit is used to drive the coil with the external signal 159 as a reference signal.

Further, instead of the polarization, the transmitted light, the absorbed light, the reflected light, the fluorescent light or the spectroscopic light may be detected. Also, the surface unevenness which can be measured from the gap control may be displayed, or the shape and the optical characteristics may be detected at the same time for display on different or the same screen. Further, the computer can be and is usually used very conveniently for the control.

In recording mode, the evanescent light converged to a minuscule point can be used as a chemical reactance energy as well as thermal reaction. An application includes forming a resist pattern used for the semiconductor processes. Also, the evanescent light can be used for gas decomposition. A minute pattern is etched directly (without mask) or formed by depositing a material directly. This technique can be used also as a write means for the ultra-high density recording apparatus.

As a modification of the invention, a recording apparatus of microscopy type having two or more probes, instead of a single probe, may be provided. Further, these probes may be combined with other type of probe (the scanning tunneling microscope, the atomic force microscope, the magnetic force microscope, the electron microscope, etc.).

A magnetic medium having the property of absorbing the light in the wavelength region of the semiconductor laser involved is preferably used as the material of the magneto-thermal recording film included in the magnetic recording film 136. Specifically, a magnetic film containing at least Tb, Fe or Co elements or a magnetic film or a multilayered film containing at least Pt or Co element is recommended.

The signal read out in the embodiment of FIG. 6 is led out as an electrical signal from a photomultiplier 143. The processing of this signal as against a given track is the same as that of the signal read from the head 2 in the embodiment of FIG. 1, and therefore will not be described any further.

Figure 11:
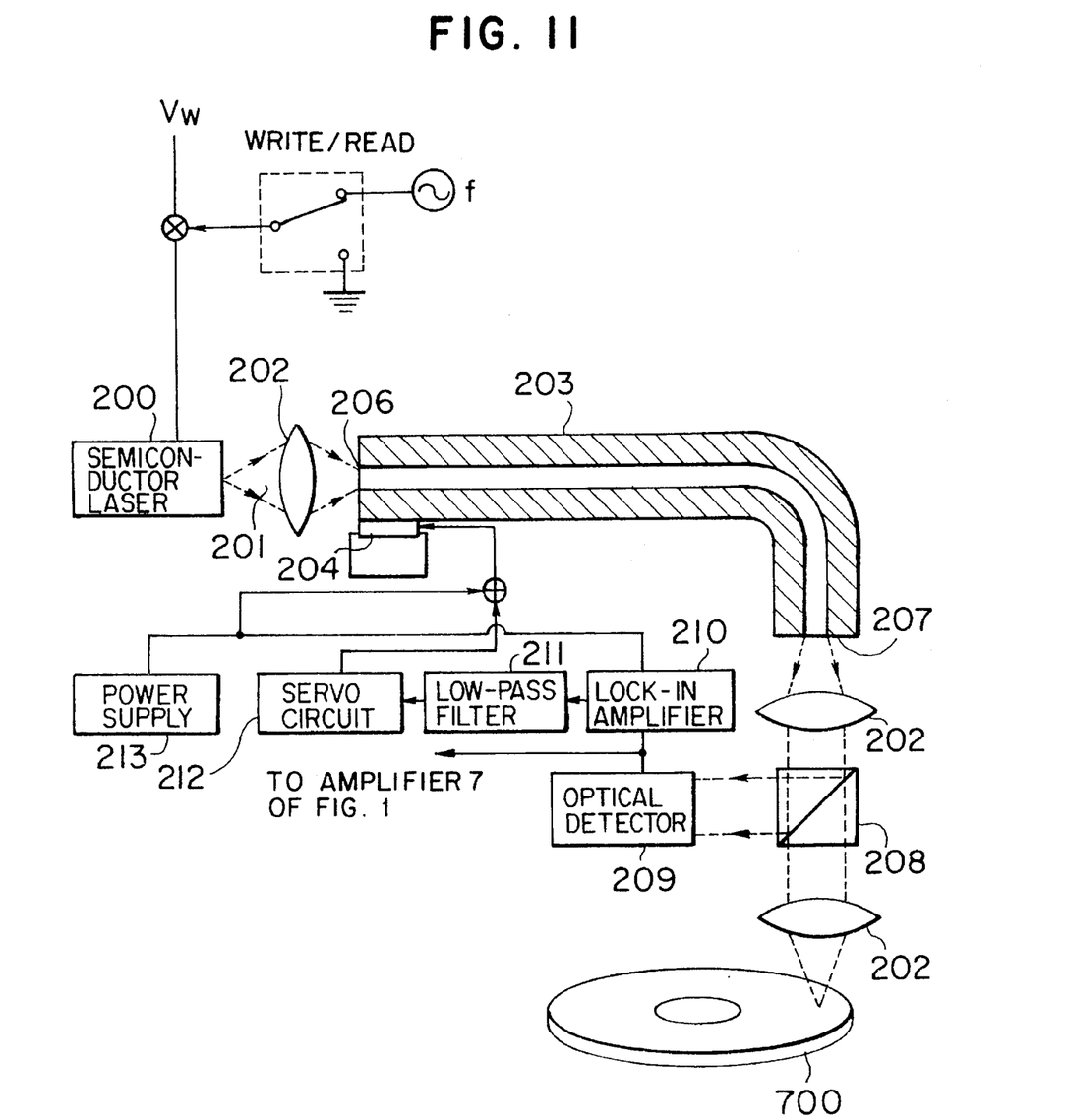
FIG. 11 is a block diagram showing a configuration of the recording-reproducing apparatus of near field microscopy type using the optical fiber probe realized according to an embodiment of the invention.

Now, with reference to FIG. 11, explanation will be made about another embodiment of the recording-reproducing apparatus using a servo system for performing the control operation requiring a comparatively accurate positional control such as for the incidence of light to an optical fiber 107 from a semiconductor laser 101 in the embodiment of FIG. 6, for example.

First, the basic operation of recording and reproducing will be described. The semiconductor laser 200 is supplied with an external signal Vw corresponding to the write/read control signal in the same manner as described with reference to FIG. 8, and produces a corresponding laser light. The laser light 201 generated from the semiconductor laser 200 enters the light incident surface 206 of the optical fiber 203 through an optical lens 202. The incident laser light 201 is radiated from the light radiation surface 207 of the optical fiber 203. The radiated light is converted into parallel light through the optical lens 202 and halved by a prism 208. One of the halved light rays, as described later, is used for the optical detection required for controlling the position of the optical fiber 203. The other ray of the halved light is formed into a light spot through the optical lens 202 and radiated on the surface of the recording medium 238. The light radiated on the surface of the recording medium 238 affects the recording film of the recording medium 238 in accordance with the contents to be recorded in write mode. In read mode, the intensity of the reflected light is changed in accordance with the contents recorded in the recording film of the recording medium 238. The reflected light radiated on the surface of the recording medium 238 which has the intensity variations according to the recorded contents is reflected from a prism 208 and detected by an optical detector 209. The read signal is processed by the optical detector 209 in the same manner as the output signal of the head 2 according to the embodiment of FIG. 1, and therefore the processing will not be explained any more.

Now, explanation will be made about the positional control of the optical fiber 203 by one of the rays into which the light is halved by the prism 208.

The optical fiber 203 is adhered to a dither and servo piezoelectric device 204. This piezoelectric device is mounted on an XY stage corresponding to the support plate 130 of FIG. 6. The piezoelectric device 204 has a structure drivable in the two axial directions of X and Y.

First, visually observing the light spot on the light incident surface 206, the optical fiber 203 is roughly positioned with respect to the optical lens 202 using the XY stage 205. Under this condition, it is sufficient if part of the light spot of the laser light 201 has entered the optical fiber 203. In the case where the above-mentioned positioning is difficult, the optical detector 209 for detecting the intensity of the light radiated from the light radiation surface 207 of the optical fiber may be used to search for the position of detection of the signal from the optical detector 209 and position the optical fiber 203 appropriately. Next, the piezoelectric device 204 is connected to an alternating power supply 213, and oscillated in two axial directions of X and Y. The amplitude of oscillation is preferably about several percent of the core diameter of the optical fiber 103. The oscillation is not simultaneous in but alternate between the two axial directions. The laser light 201 that has entered the light incident surface 206 of the optical fiber 203 is radiated from the light radiation surface 207 of the optical fiber 203. The light thus radiated is made in to parallel light through the optical lens 202 and split into two light rays by the prism 208. The intensity of one of the light rays thus halved is detected by the optical detector 209, and the detected signal is multiplied by sine of the dither frequency in a lock-in amplifier 210. The high-frequency components more than double the oscillation frequency among the signals obtained at the lock-in amplifier 210 are cut off by a low-pass filter 211, and the resulting signal is applied to a servo circuit 212. The signal that passed through the low-pass filter 211 is approximately proportional to the distance of displacement of the light spot of the light 201 existing on the light incident surface 206 of the optical fiber 203 from the position of the maximum optical coupling efficiency. A mechanism for moving the position of the optical fiber 203 by the distance proportional to the obtained signal is included in the servo circuit 212 thereby to control the position of the optical fiber 203 by the piezoelectric device 204.

According to this invention, a reproducing head wider than the width of the track storing information is possible, and therefore, the head tracking accuracy for reproduction is remarkably relaxed. As a result, even when the track density of the recording medium is greatly increased, information can be positively reproduced. The recording density of the information recording-reproducing apparatus thus is remarkably improved.

Also, according to this invention, information from a plurality of tracks can be reproduced at a time, and therefore, a high-speed reproducing operation is made possible. The signal recorded in the medium is an analog signal, and therefore a non-saturated recording advantageous for high density recording is realized in magnetic recording applications of the method.

Further, according to the method of invention, the baseband signal to be recorded is either a digital (binary), an analog signal or a mixture of the two, thereby permitting recording of a variety of information in the same apparatus.

We claim:

1. A method for recording and reproducing information on a recording medium in selected one of physical and chemical fashions, comprising the steps of:
   a) dividing the recording surface of the recording medium into a plurality of tracks;
   b) assigning a modulation parameter to each track so that at least adjacent tracks on the recording medium are assigned different modulation parameters;
   c) modulating a carrier signal on the basis of said modulation parameter designated to the track where an information signal is to be recorded, and recording the modulation signal on the track, said carrier signal being specified by said modulation parameter; and
   d) designating the modulation parameter assigned to a track holding the intended information from a reproducing signal produced from a recording signal reproducing means and demodulating the original information on the basis of said modulation parameter.

2. An information recording-reproducing method according to Claim 1, wherein each track on the recording medium is assigned a unique modulation parameter.

3. An information recording-reproducing method according to Claim 1, wherein the same modulation parameter is allowed to be assigned to different tracks spaced from each other by at least a sensitive range of the reproducing means along the track.

4. An information recording-reproducing method according to claim 1, further comprising the steps of:
   a) dividing the tracks into a plurality of groups; and
   b) assigning a different set of modulation parameters to at least two groups of tracks.

5. An information recording-reproducing method according to claim 4, wherein a unique set of modulation parameters is assigned to each group of tracks.

6. An information recording-reproducing method according to claim 1, comprising the steps of dividing the tracks into a plurality of groups, and assigning the same set of modulation parameters to different groups spaced from each other by at least a sensitive range of the reproducing means.

7. An information recording-reproducing method according to claim 1, wherein the carrier signal is amplitude-modulated.

8. An information recording-reproducing method according to claim 1, wherein the carrier signal is angle-modulated.

9. An information recording-reproducing apparatus for recording and reproducing information on a recording medium in selected one of physical and chemical fashions, comprising:
   a) a recording medium with the recording surface thereof divided into a plurality of tracks;
   b) means for assigning a modulation parameter to each track so that at least adjacent tracks on the recording medium are assigned different modulation parameters;
   c) means for modulating a carrier signal on the basis of said modulation parameter designated to a track where an information signal is to be recorded, said carrier signal being specified by said modulation parameter;
   d) means for recording the modulation signal on said track;
   e) means for reproducing the modulation signal recorded on the recording medium;
   f) means for designating the modulation parameter of the track where the desired information is recorded; and
   g) means for demodulating the desired information from the signal reproduced using the designated modulation parameter.

10. An information recording-reproducing apparatus according to claim 9, further comprising means for assigning a unique modulation parameter to each of said tracks on said recording medium.

11. An information recording-reproducing apparatus according to claim 9, further comprising means for assigning the same modulation parameter to different tracks spaced from each other by at least a sensitive range of the reproducing means along the track.

12. An information recording-reproducing apparatus according to claim 9, further comprising:
   a) means for dividing the tracks into a plurality of groups; and
   b) means for assigning a different set of modulation parameters to at least two groups of tracks.

13. An information recording-reproducing apparatus according to claim 12, further comprising means for assigning a unique set of modulation parameters to each group of tracks.

14. An information recording-reproducing apparatus according to claim 9, further comprising means for dividing the tracks into a plurality of groups, and means for assigning the same set of modulation parameters to different groups spaced from each other by at least a sensitive range of the reproducing means.

15. An information recording-reproducing apparatus according to claim 9, comprising an amplitude modulator as the means for modulating the carrier signal.

16. An information recording-reproducing apparatus according to claim 9, comprising an angle modulator as the means for modulating the carrier signal.

17. An information recording-reproducing apparatus according to claim 9, comprising recording signal reproducing means having a sensitive range wider than the track width.

18. An information recording-reproducing apparatus according to claim 9, comprising means for selecting and recording a selected one of a digital or an analog signal on a given track on the same medium.

19. An information recording-reproducing apparatus according to claim 9, wherein at least one of the means for recording the modulation signal on said track and the means for reproducing modulation signal recorded on the recording medium comprise:

means for introducing laser light to a recording surface of the recording medium by an optical fiber having a sharp tip;

means for radiating the laser light on the recording surface of the recording medium; and means for a selected one of updating and reading the contents of recording in the modulated signal to be recorded for each track;

wherein a semiconductor laser is used as a light source of the laser light, and the intensity of selected one of the transmission, absorption, reflection and polarization of the laser light is used as an indication of the recorded contents.

20. An information recording-reproducing apparatus according to claim 9, wherein at least one of the means for recording the modulation signal on said track and the means for reproducing the modulation signal recorded on the recording medium comprises:

an optical fiber having a sharp end;

a semiconductor laser optically coupled to the other end of the optical fiber; and the recording medium being a magnetic medium arranged in the vicinity of the sharp end of the optical fiber and having magnetic characteristics thereof changing locally by absorbing light in a wavelength band from the semiconductor laser.

21. An information recording-reproducing apparatus according to claim 9, wherein at least one of the means for recording the modulation signal on said track and the means for reproducing the modulation signal recorded on the recording medium comprises:

a first optical fiber having a sharp end; and another optical fiber optically coupled to the other end of the first optical fiber;

wherein evanescent light from the sharp end of the first optical fiber is used as chemical energy for reaction.

22. An information recording-reproducing apparatus according to claim 9, wherein at least one of the means for recording the modulation signal on said track and the means for reproducing the modulation signal recorded on the recording medium comprises:

means for introducing laser light to a recording surface of the recording medium by an optical fiber having a sharp tip;

means for radiating the laser light on tracks on the recording surface of the recording medium;

means for a selected one of updating and reading the contents of recording in the signal modulated for each track; and an optical coupling system for applying and coupling the light emitted from the light source to an optical waveguide.

23. An information recording-reproducing apparatus according to claim 22, wherein the optical coupling system includes means for moving the relative positions of the light incident on the waveguide and said waveguide, and means for detecting the intensity of selected one of the incident light, light that has passed through the optical coupling system and the light reflected without coupling.

24. An information recording-reproducing apparatus according to claim 23, wherein the optical coupling system comprises:

means for dithering at least selected one of a light source, an optical element and an optical waveguide existing on a light path at a predetermined frequency;

means for detecting the intensity of the light that has passed through said optical waveguide;

means for multiplying the detected light intensity signal by sine of the dither frequency and removing the frequency component double the dither frequency contained in the detected signals; and servo means for controlling the position of at least selected one of the light source, the optical element and the optical waveguide existing on the light path in such a manner that the signal produced by the foregoing operation approaches to zero as an amount of deviation between the light beam and the optical waveguide.

* * * * *